May 14, 1957  R. F. BECKER  2,792,492
SEPARABLE SUSPENSION DEVICE FOR AN EXTENSION LAMP
Original Filed Dec. 6, 1949  2 Sheets-Sheet 1

INVENTOR.
RODGER F. BECKER
BY
ATTORNEY

United States Patent Office 2,792,492
Patented May 14, 1957

2,792,492
SEPARABLE SUSPENSION DEVICE FOR AN EXTENSION LAMP

Rodger F. Becker, Kalamazoo, Mich.

Original application December 6, 1949, Serial No. 131,398, now Patent No. 2,716,701, dated August 3, 1955. Divided and this application June 28, 1955, Serial No. 518,627

6 Claims. (Cl. 240—54)

This invention, which is a division of Serial No. 131,398, filed December 6, 1949, now Patent No. 2,716,101, issued August 30, 1955, relates in general to an extension lamp having suspension means, such as a hook, separably secured thereto, and more particularly to a device for effecting such separation without damaging the parts thereof, when forces urging said lamp and hook apart are imposed thereon.

Extension lamps commonly used in mechanical work and related fields are generally provided with a suspension device, such as a hook, whereby the workman can suspend the lamp on any convenient support and thereby have both hands free.

However, certain hazards are associated with such devices. An example that occurs in the automotive repair field arises when a forgetful mechanic moves a car with an extension lamp still hooked onto the bumper. The extension cord often breaks and leaves a live wire free to cause injury. Or, in any event, even if no injury is caused by the live wire, it may require extensive repairs. Similar damage may arise when a workman trips over the extension cord or a passing object catches the extension cord.

Until the time of this invention, no device has, to my knowledge, been devised which would serve the functions of a suspendible extension lamp yet would eliminate this hazardous feature accompanying the use of such a lamp.

This invention contemplates an extension lamp having a suspension device, such as a hook, detachably secured thereto. The suspension device is so attached to the lamp that under ordinary handling it is held securely in place, but when a sudden force is applied to the extension cord, the suspension device will be automatically detached from the remainder of the lamp. Thus, when my lamp is hung upon a movable object, such as an auto bumper, there is no danger that the extension cord will be broken, for any sudden jerk or pull upon the cord will effect a disengagement between the suspension device and the rest of the lamp. The resulting fall may break the lamp bulb, but the lamp itself will not be damaged by the separation.

Accordingly, a primary object of this invention is the provision of an extension lamp, having a detachable means from which the lamp may be suspended, which will prevent breaking of the extension cord when any sudden force is applied to the suspension means while the lamp is in use.

A further object of this invention is the provision of a suspendible extension lamp having a detachable suspension device which will not be disengaged from the lamp during ordinary handling.

Another object of the invention is the provision of means for detachably securing a suspension device to an extension lamp, whereby said suspension device can be easily and quickly re-attached to said lamp after a separation has occurred.

Another object of the invention is the provision of means for detachably securing a suspension device to an extension lamp, as aforesaid, which will separate by application of forces which do not exceed the tensile limits of the extension cord.

A further object of the invention is to provide a device as above stated wherein the bulb is readily replaceable.

Other objects and purposes of this invention will become apparent to persons familiar with this type of equipment upon referring to the accompanying drawings and upon reading the following specification:

For illustration of my invention, reference is made to the accompanying drawings in which.

Construction

Figure 1:
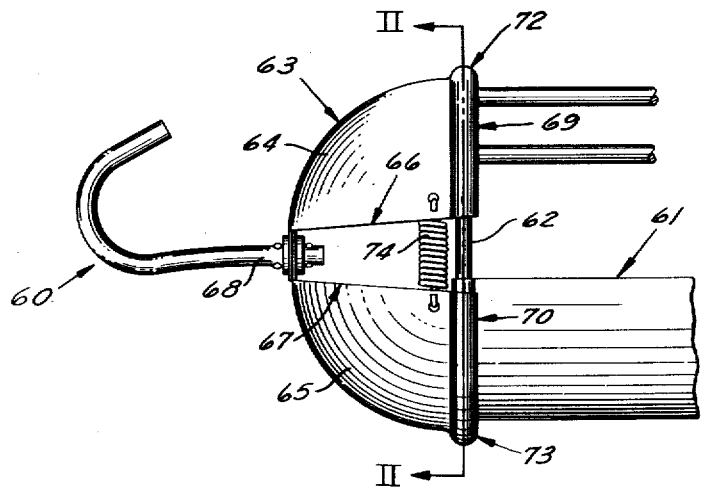
Figure 1 is a fragmentary, side elevation view of an extension type lamp including the separable suspension device to which this invention relates.

For convenience and without intending any limitation the end of the lamp, or parts associated therewith, appearing toward the left side of Figure 1 may hereinafter be termed "upper end" and the other end of the lamp, or parts associated therewith, may hereinafter be termed "lower end."

The extension lamp includes a base or handle member 56 of the conventional type having a switch, an electric cord with a plug at its outer end, and a bulb socket therein. A lamp guard 61 is secured at its lower end to the handle 56 by a gripping bracket 57. The lamp guard includes a generally hemi-cylindrical reflector shell 58 and a generally hemi-cylindrical wire grid 59 secured to said shell.

Figure 2:
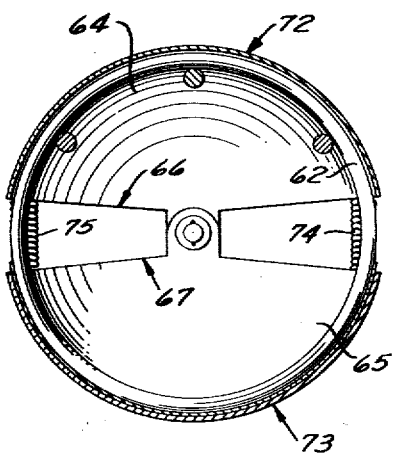
Fig. 2 is a sectional view taken along the line II—II of Figure 1.
Figure 3:
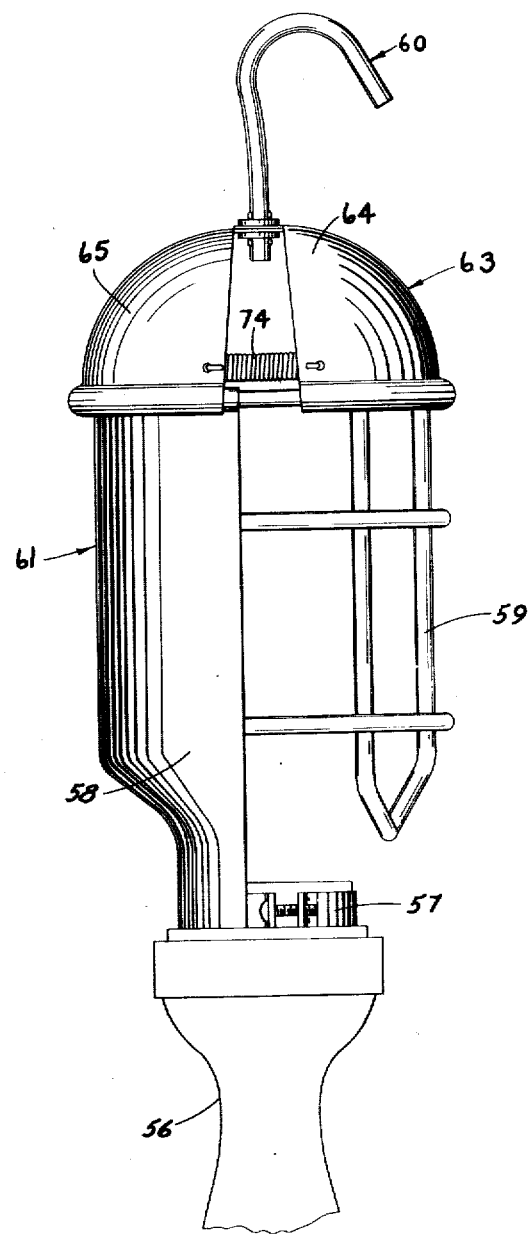
Figure 3 is a side elevation view of the extension type lamp.

As shown in Figures 1 and 2, I have provided a connector 63 by means of which a suspension device, such as the hook 60, may be detachably secured to a lamp guard 61. A circular support ring 62 is secured to the upper end of the lamp guard 61 so that it lies in a plane perpendicular to the longitudinal axis of the lamp. The connector device 63 is comprised of a pair of spherical shell or clamping elements 64 and 65 pivotally supported along one edge 66 and 67, respectively, of each upon the shank 68 of the hook 60. Each shell has a semi-circular edge 69 and 70, respectively, which edges lie substantially within a single plane spaced from the hook 60, and substantially perpendicular to the shank 68 thereof.

The shells 64 and 65 are provided with opposed grooves 72 and 73 adjacent to and parallel with the semi-circular edges 69 and 70. Said grooves are shaped for snug embracing of the ring 62. Resilient means such as the springs 74 and 75 connect said shell edges 66 and 67 on opposite sides of the hook shank 68 for yieldingly resisting the separation of said shells adjacent to the semi-circular edges 69 and 70 thereof.

Operation

The connector 63 is removably attached to the lamp guard 61 by spreading the shells 64 and 65 apart at their semi-circular edges 69 and 70 against the springs 74 and 75. The circular edges of the shells are then placed over the upper end of the lamp guard 61 and released so that the grooves 72 and 73 snugly embrace the ring 62, being so held by the springs 74 and 75. The pivotal attachment of the shells upon the shank 68 of the hook 60 enables the hook to swivel with respect to said shell halves.

The grip of the shells upon the support ring 62 effected by the springs 74 and 75 is preferably strong enough to prevent disengagement therebetween during ordinary use of the lamp. However, said grip is likewise overcome by a force substantially less than that required to break or disconnect the extension cord.

Separation of the connector 63 and the lamp guard 61 is accomplished when sufficient oppositely directed forces are applied to the hook 60 and the lamp guard 61 thereby effecting a spreading apart of the shells 64 and 65.

It will be observed also that the separation means illustrated in Figures 1 and 2 may also be utilized in effecting a quick change of the bulb.

Although the above mentioned drawings and description apply to a particular, preferred embodiment of my invention, it is not my intention, implied or otherwise, to eliminate other variations or modifications which lie within the scope of the invention unless specifically stated to the contrary in the hereinafter appended claims.

I claim:

1. An extension lamp, comprising in combination: a base member, said base member having a socket adapted to receive a lamp bulb and having an electric cord secured thereto; an elongated, cylindrical guard member adapted to surround said lamp bulb, one end of said guard member being connected to said base member; a ring on the other end of said guard member, said ring lying within a plane substantially perpendicular to the longitudinal axis of said guard member; a pair of opposed clamping elements, said elements each having a groove in the opposing surfaces thereof, said grooves being aligned and embracing a portion of said ring; resilient means urging said clamping elements toward each other with a force less than the force necessary to break said cord; a suspension device supported upon said clamping elements, said elements being capable of a limited amount of movement away from each other and transverse to the longitudinal axis of said guard member to disengage from said ring upon the application of a force on said suspension device which is greater than the force urging said elements toward each other and less than the force necessary to break said cord.

2. An extension lamp, comprising in combination: a base member, said base member having a socket adapted to receive a lamp bulb and having an electric cord secured thereto; an elongated, cylindrical guard member adapted to surround said lamp bulb, one end of said guard member being connected to said base member; a ring on the other end of said guard member, said ring member lying in a plane substantially perpendicular to the longitudinal axis of said guard member; a pair of clamping shells having concave, opposing surfaces and a pair of arcuate edges lying substantially within said plane; means defining opposing grooves in said surfaces adjacent to said edges for snugly embracing said ring; resilient means on said shells yieldably holding said ring within said grooves with a force less than the force necessary to break said cord; a suspension means pivotally mounted on said shells; said shells being capable of a limited amount of movement away from each other and transverse to the longitudinal axis of said guard member to disengage from said ring upon the application on said suspension means of a force parallel to the longitudinal axis of said guard member which is greater than the force holding said ring within said grooves and less than the force necessary to break said cord.

3. The structure of claim 2 wherein said suspension means is a hook having a shank pivotally disposed within an opening in each said shell.

4. The structure of claim 3 wherein said resilient means comprises a pair of coiled springs extending between corresponding opposed portions of said shells adjacent to said edges thereof.

5. An extension lamp, comprising in combination: a handle, said handle having a socket adapted to receive a lamp bulb; an elongated, cylindrical guard member adapted to surround said lamp bulb, said guard member including a generally hemi-cylindrical reflector shell and a generally hemi-cylindrical wire grid, one end of said guard member being connected to said handle; a ring of circular cross-section secured to said guard member at the other end thereof and lying within a plane perpendicular to the longitudinal axis thereof; a lamp suspension device having a rod extending therefrom; a pair of shells pivotally mounted upon said rod, one edge of each shell being semi-circular and lying substantially within a plane substantially perpendicular to said rod and said shells having opposing grooves substantially defining a circle adjacent to said edges and adapted for snugly embracing said ring; resilient means secured between said shells for yieldably holding said ring within said grooves; whereby the imposition of predeterminable, oppositely directed forces upon said handle and said suspension device effects a disengagement between said ring and said shells.

6. An extension lamp, comprising in combination: a handle, said handle having a socket adapted to receive a lamp bulb and having an electric cord secured thereto; an elongated, cylindrical guard member adapted to surround said lamp bulb, one end of said guard member being connected to said handle; a pair of clamping shells having opposed surfaces, said surfaces having opposing edges snugly embracing the opposite sides of the other end of said guard member; a pair of extensible coil springs extending between the opposed surfaces of said shells, urging said shells toward each other with a force less than the force necessary to break said cord, to maintain the opposing edges thereof snugly embracing the other end of said guard member; a suspension hook supported on said clamping elements, said shells being capable of a limited amount of movement away from each other and transverse to the longitudinal axis of said guard member to disengage from said other end upon the application on said suspension device of a force parallel to the longitudinal axis of said guard member which is greater than the force urging said shells toward each other and less than the force necessary to break said cord.

References Cited in the file of this patent

UNITED STATES PATENTS

| 1,958,222 | Wilson | May 8, 1934 |
| 2,652,484 | Graves | Sept. 15, 1953 |

FOREIGN PATENTS

| 803 | Great Britain | 1909 |

UNITED STATES PATENT OFFICE
CERTIFICATE OF CORRECTION

Patent No. 2,792,492

May 14, 1957

Rodger F. Becker

It is hereby certified that error appears in the above numbered patent requiring correction and that the said Letters Patent should read as corrected below.

In the heading to the printed specification, line 9, for "August 3," read -- August 30, --; column 1, line 16, for the patent number "2,716,101" read -- 2,716,701 --.

Signed and sealed this 13th day of August 1957.

(SEAL)
Attest:

KARL H. AXLINE
Attesting Officer

ROBERT C. WATSON
Commissioner of Patents